United States Patent [19]

Daaboul et al.

[11] 4,363,938

[45] Dec. 14, 1982

[54] METHOD OF AND APPARATUS FOR ECHO DETECTION IN VOICE CHANNEL SIGNALS

[75] Inventors: Fouad Daaboul, Verdun; Tiu Le Van, Touraine; Kit-Chung Fung, Ottawa, all of Canada

[73] Assignee: Northern Telecom Limited, Montreal, Canada

[21] Appl. No.: 187,785

[22] Filed: Sep. 16, 1980

[51] Int. Cl.³ .............................................. H04B 3/20
[52] U.S. Cl. ................................................. 179/170.2
[58] Field of Search .............. 179/170.2, 170.6, 170.8, 179/1 P

[56] References Cited

U.S. PATENT DOCUMENTS

| | | | |
|---|---|---|---|
| 3,896,273 | 7/1975 | Fariello | 179/170.6 |
| 3,985,979 | 10/1976 | Durand et al. | 179/170.6 |
| 4,028,506 | 6/1977 | Araseki et al. | 179/170.2 |
| 4,029,912 | 6/1977 | Geigel et al. | 179/170.2 |
| 4,051,332 | 9/1977 | Izumi et al. | 179/170.2 |
| 4,088,851 | 5/1978 | Gupta et al. | 179/170.2 |
| 4,192,979 | 3/1980 | Jarkowski, Jr. | 179/170.2 |

Primary Examiner—Joseph A. Popek
Attorney, Agent, or Firm—R. John Haley

[57] ABSTRACT

To detect echoes on a transmit path of signals on a receive path, an echo detector stores averages of the signals on the receive path each for a period equal to or just greater than the maximum end delay for received signals to reach the transmit path, and determines the greatest magnitude of the stored signals. This greatest magnitude, reduced by the worst case echo return loss, is compared with the current signal average on the transmit path, and an echo decision is produced in dependence upon this comparison and a detection of speech signals on each of the transmit and receive paths. The echo detector is particularly useful in a digital speech interpolation transmission system.

7 Claims, 3 Drawing Figures

METHOD OF AND APPARATUS FOR ECHO DETECTION IN VOICE CHANNEL SIGNALS

This invention relates to an echo detector for, and a method of, detecting the presence on a first path of a sampled voice channel signal on a second path.

Echoes are produced in a transmission system whenever an impedance discontinuity or mismatch exists, such as at the junction between four-wire and two-wire paths of a transmission channel. In order to avoid annoying effects of echoes, it is well known to provide echo suppressor apparatus which operates to effectively disable the echo return path of a subscriber who is transmitting, to remove echo suppression in a so-called double talk situation in which subscribers at both ends of the transmission channel are simultaneously talking, and to provide a hangover period at the end of a double talk situation to avoid undesirable speech signal clipping. For example, a known form of echo suppressor is disclosed in Geigel et al U.S. Pat. No. 4,029,912 issued June 14, 1977.

In a digital speech interpolation (DSI) transmission system, echo detection and consequent suppression is important not only to avoid the annoying effects of echoes but also to avoid unduly increasing the activity of the DSI transmission, which would be a result of transmitting echo signals. However, echo detection in a DSI transmission system is hampered by the facts that the transmitted and received signals are not synchronous and that the end delay and echo return loss are variable and different for each channel.

Accordingly, an object of this invention is to provide an improved form of echo detector for use in a DSI transmission system.

The echo detector of this invention is particularly suited for use in a DSI transmission system as described and claimed in copending United States patent application Ser. No. 187,821 filed concurrently herewith, the disclosure of which is incorporated herein by reference.

According to this invention there is provided an echo detector for detecting the presence on a first path of echoes of a sampled voice channel signal on a second path, comprising:

means responsive to speech signals for producing a first signal when speech signals are present on the first path; means responsive to speech signals for producing a second signal when speech signals are present on the second path; means for storing the n most recent signals which have occurred on the second path, where n is a plural integer equal to the number of signals which occur on the second path during a first predetermined period; means for determining the greatest magnitude of the stored signals; means for producing a third signal in dependence upon the magnitude of each signal on the first path relative to the current greatest magnitude; and means responsive to the first, second, and third signals for producing an echo decision in respect of the current signal on the first path.

The first predetermined period is conveniently selected to be equal to or a little greater than the maximum end delay, typically 25 ms, which is required by a signal on the second path to reach the first path as an echo.

The means for producing the third signal is preferably arranged to produce said third signal whenever a signal on the first path has a magnitude which is not at least a predetermined amount greater than said current greatest magnitude. The predetermined amount is conveniently selected to be equal to the worst case echo return loss, typically 5 or 6 dB, which is the minimum attenuation suffered by a signal on the second path in reaching the first path as an echo.

In order to bridge intersyllabic pauses in speech during a double talk situation, the echo detector preferably includes means for inhibiting production of the echo decision for a second predetermined period in response to the third signal being produced in respect of a signal on the first path following a signal on the first path in respect of which the first signal was produced and the third signal was not produced.

At least one of the means responsive to speech signals preferably comprises a comparator for comparing signals on the relevant path with a fixed threshold level. For example, in a DSI transmission system such a comparator can be provided for responding to speech signals on the receive path, whereas a more complicated form of speech detector, which is in any event provided in the system to detect speech to be transmitted, can be used for responding to speech signals on the transmit path. For example, such a speech detector could take the form of the speech detector described and claimed in copending United States patent application Ser. No. 187,816 filed concurrently herewith. Alternatively, however, a more sophisticated detector can be provided for responding to speech signals on the receive path, and/or a simpler detector can be provided for responding to speech signals on the transmit path.

In order to simplify and reduce the costs associated with storing signals and determining the greatest magnitude of the stored signals, the signals on each of the first and second paths are preferably constituted each by an average of a plurality of individual samples of a respective voice channel signal. To this end, the echo detector preferably also includes means for producing each signal on the first path and on the second path by removing d.c. offsets from and averaging a plurality of individual samples of respective voice channel signals.

The invention also extends to a method of detecting the presence on a first path of echoes of a sampled voice channel signal on a second path, comprising the steps of:

detecting speech signals on each of said paths; storing the n most recent signals which have occurred on the second path, n being a plural integer; determining the greatest magnitude of the stored signals; comparing each signal on the first path with the current greatest magnitude; and producing an echo decision in dependence upon the detection of speech signals and the comparison.

The invention will be further understood from the following description of a preferred embodiment thereof with reference to the accompanying drawings, in which.

In each of the drawings, multiple lines are indicated by a single line on which is marked a bar with an adjacent numeral indicating the number of lines present.

Figure 1A:
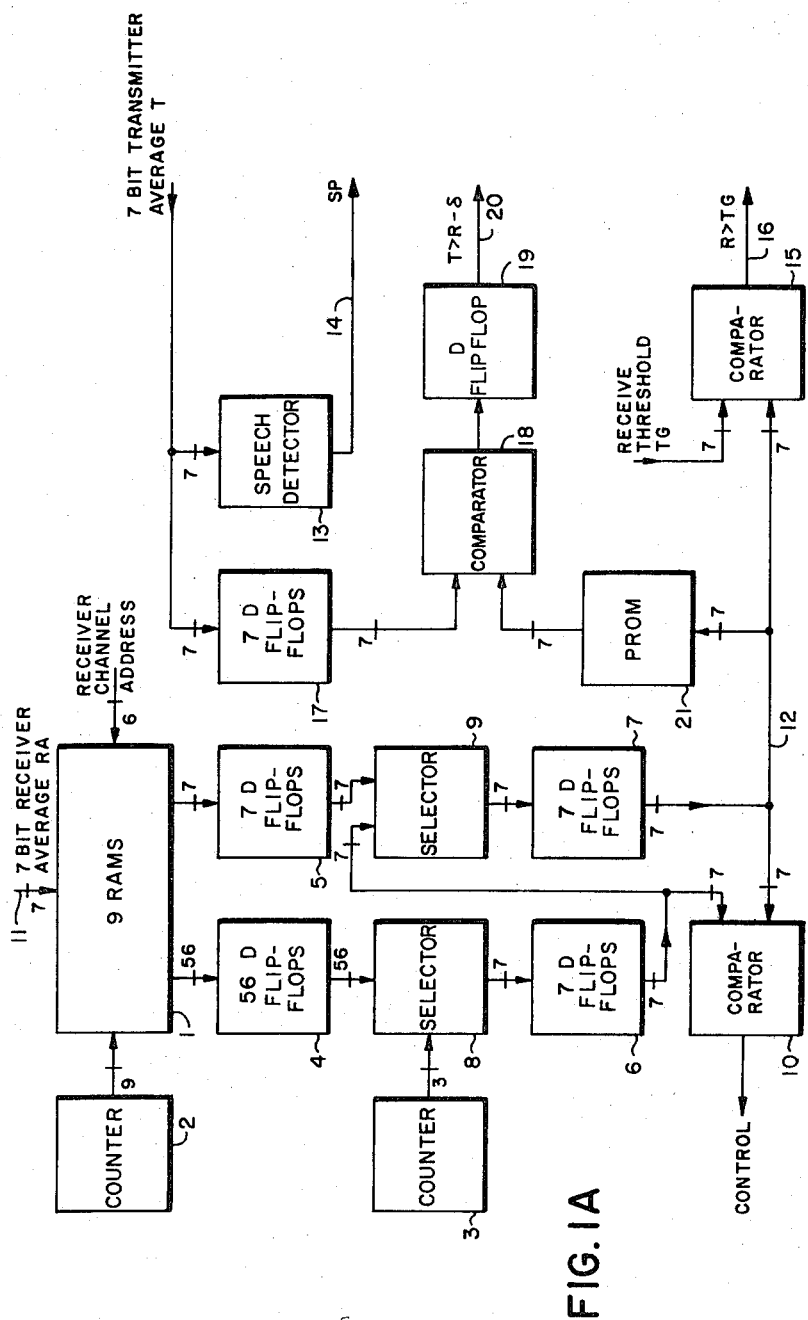
FIGS. 1A and 1B illustrate an echo detector for a DSI transmission system.
Figure 1B:
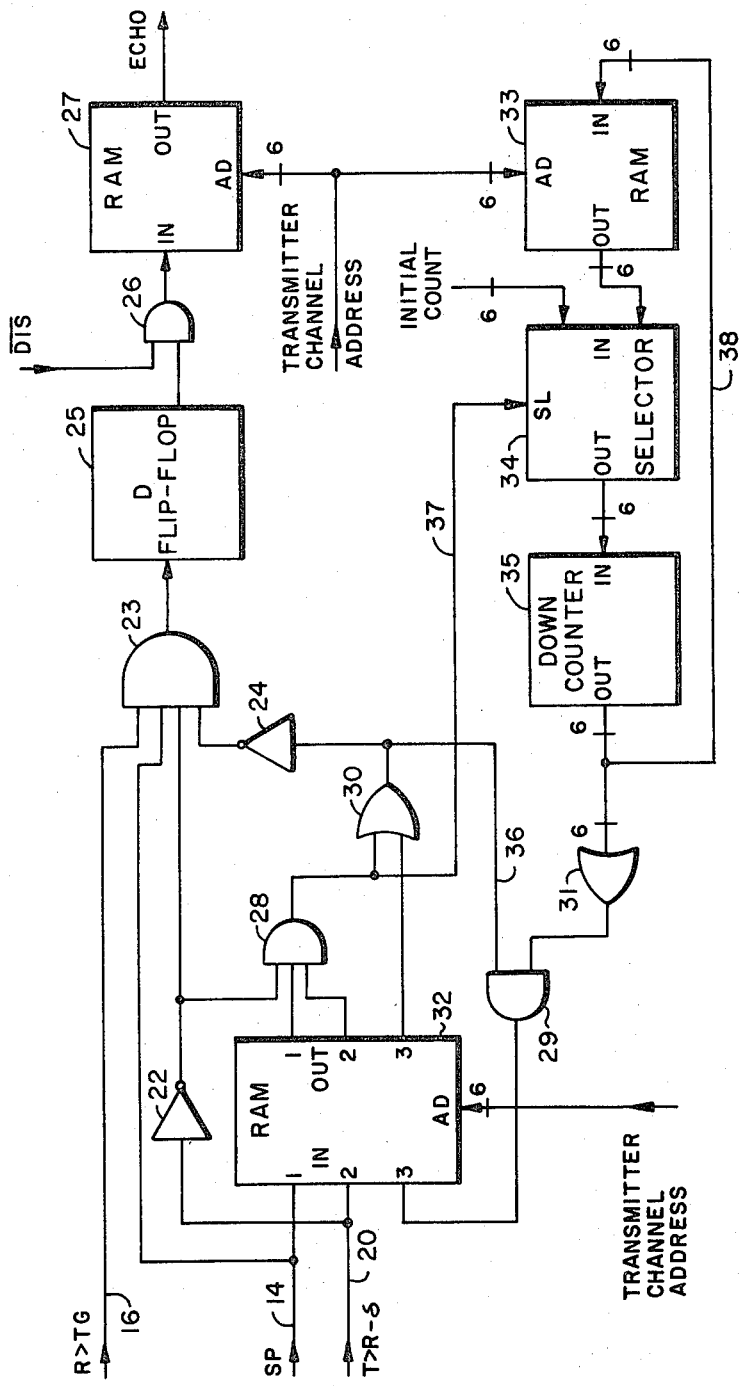

The echo detector described below with reference to FIGS. 1A and 1B is intended for use in a DSI transmission system of the type described in copending United States patent application Ser. No. 187,821 already referred to, in which once in each superframe an echo decision is updated for each of a plurality of voice signal channels in respect of each of which there is an individual sample contained in each of a plurality of frames forming the superframe. In the present case, in each superframe there are 27 frames each comprising 48 voice channel signal samples each of 8 bits, for each of the two directions of transmission. As the echo decision for each channel is updated only once in each superframe, it is based on average signals each of which represents the average of 27 successive signal samples of the relevant channel, rather than being based directly on the individual signal samples. For the transmit direction a 7-bit transmitter average T is produced for each channel by a circuit as described below with reference to FIG. 2. Similarly, for the receive direction a 7-bit receiver average RA is produced for each channel by a separate circuit as described below with reference to FIG. 2. The echo detector illustrated in FIGS. 1A and 1B is responsive to these averages T and RA.

In the DSI system, the production of an echo decision for each channel is hampered by the fact that the signals on the receive path are delayed by a variable end delay of up to 25 ms before appearing as echoes on the transmit path. In addition, the transmitter and receiver signals are not synchronous; thus a transmitter channel address, which is produced for each channel in each frame during the time that a signal sample of this channel is present on the transmit path, does not occur synchronously with a receiver channel address which is likewise produced for each channel in each frame during the time that a signal sample of this channel is present on the receive path.

In view of these considerations, the echo detector compares, for each channel once in each superframe, the transmitter average T with the maximum or peak receiver average RA which has occurred in the present and preceding 8 receiver super-frames. The number of 8 superframes is selected to provide a total duration equal to or just greater than the maximum end delay of 25 ms; in the DSI system discussed here each superframe has a duration of 3.373 ms, so that the 8 superframes have a total duration of about 27 ms. The echo detector is arranged to determine the peak receiver average, effect the comparison, and update the echo decision for each channel during the 15th and 16th frames of each superframe.

Referring to FIG. 1A, for determining the peak receiver average for each channel the echo detector comprises 9 48-channel×7-bit RAMs 1, counters 2 and 3, buffer stores formed by D flip-flops 4, 5, 6, and 7, selectors 8 and 9, a comparator 10, and a control unit which is not shown. This part of the echo detector operates as follows.

Under the control of the receiver channel address, the 7-bit receiver average RA supplied via lines 11 for each channel is written into one of the RAMs 1, the particular RAM being varied cyclically under the control of the counter 2. In consequence, at any instant the RAMs 1 store the present and the previous 8 receiver averages RA for each of the 48 channels. For each channel in turn, the current receiver average is transferred to the D flip-flops 5, and the previous 8 receiver averages are transferred to the D flip-flops 4, to synchronize them to the transmitter timing. Under the control of the counter 3, the selector 8 selects one of the previous 8 receiver averages and applies this to the D flip-flops 6. Under the control of the control unit (not shown), the selector 9 selects the current receiver average and transfers this to the D flip-flops 7. The comparator 10 compares the averages stored in the flip-flops 6 and 7 and emits a comparison signal to the control unit. If this signal indicates that the average stored in the flip-flops 6 is greater than that stored in the flip-flops 7, the control unit causes the selector 9 to transfer the average contained in the flip-flops 6 to the flip-flops 7; otherwise the selector 9 is unchanged. The control unit then increments the counter 3 to transfer another previous average into the flip-flops 6. The comparison and subsequent steps are repeated in turn for all of the previous receiver averages, after which it can be seen that the peak receiver average R for the current and previous 8 superframes is contained in the flip-flops 7 and hence is present on lines 12.

The echo decision for each channel is based on three criteria. A first of these is that speech must be present on the transmit path. To this end the transmitter average T is supplied to a speech detector 13 which, when speech signals are present for the relevant channel, produces an output signal SP on a line 14. The speech detector 13 can be of any suitable form, but is desirably of the type described in copending United States patent application Ser. No. 187,816 already referred to. A second of the three criteria is that speech must be present on the receive path. To determine this the peak receiver average R on the lines 12 is compared with a fixed receive threshold TG in a comparator 15 whose output is a signal R>TG on a line 16. The third criterion serves to distinguish between an echo situation and a double-talk situation, and is based on the fact that in passing from the receive path to the transmit path an echo signal must suffer an attenuation of at least $\delta$. $\delta$ is the worst case echo return loss, and is for example 5 to 6 dB. To produce this third criterion, the transmitter average T is buffered in D flip-flops 17 and then compared with R-$\delta$ in a comparator 18, whose output is buffered in a D flip-flop 19 to produce a signal T>R-$\delta$ on a line 20. Because T and R are averages based on a non-linear companding code, whereas $\delta$ is a fixed attenuation, the difference R-$\delta$ is produced using a PROM (programmable read-only memory) 21 which is addressed by the peak receiver average R on the lines 12 to produce the difference R-$\delta$ at its output.

Referring now to FIG. 1B, the signals SP and R>TG on the lines 14 and 16 respectively and the signal $\overline{T>R-\delta}$ produced by inversion in an inverter 22 of the signal on the line 20, are applied to three of the inputs of a four-input AND gate 23. The gate 23 normally receives an enabling logic 1 at its fourth input from an inverter 24. The output of the gate 23 is buffered in a D flip-flop 25 before being gated with a disabling signal $\overline{DIS}$ in an AND gate 26. The disabling signal $\overline{DIS}$ is normally a logic 1 to enable the gate 26, but becomes a logic 0 for channels which are carrying data signals in respect of which echo detectors on the transmission channel must be inhibited. The output of the gate 26 constitutes the echo decision for the particular channel; is stored in a RAM 27 at the relevant transmitter channel address, supplied to an address input AD of the RAM 27; and is produced at the output of the RAM 27 on an echo decision output line.

The remainder of the circuitry shown in FIG. 1B constitutes a hangover circuit which serves to inhibit production of the echo decision on the echo decision output line for a predetermined period, for example 31 superframes or about 104 ms, after a double talk situation terminates. The hangover circuit consists of the inverter 24, a three-input AND gate 28, a two-input AND gate 29, a two-input OR gate 30, a six-input OR gate 31, a 48-channel×3-bit RAM 32, a 48-channel×6-bit RAM 33, a six-bit selector 34, and a six-bit down counter 35. The RAMs 32 and 33 are addressed by the transmitter channel address which is supplied to address inputs AD of these RAMs.

For each channel, the RAM 32 is arranged to store the signals SP and T>R-δ on the lines 14 and 20 respectively, and the normally 0 output of the gate 29, for one superframe. The inputs of the AND gate 28 are supplied with the signal $\overline{T>R-\delta}$ from the inverter 22, and the signals SP and T>R-δ in respect of the previous superframe from the RAM 32. Consequently the output of the gate 28 is 0 except immediately at the end of a double talk situation when it becomes 1. Thus at the end of a double talk situation on any channel, the gate 28 produces a logic 1 at its output. This is conducted via the OR gate 30 to the inverter 24 to inhibit the AND gate 23 so that the echo decision is not produced for the channel, and via a line 36 to one input of the gate 29 which is consequently enabled. The output of the gate 28 is also applied via a line 37 to a select input SL of the selector 34 to cause a 6-bit initial hangover count of, for example, 31 to be entered into the counter 35. This count is reduced by one in the down counter and the reduced count is stored for the particular channel in the RAM 33 via lines 38. The outputs of the counter 35 are connected to the inputs of the OR gate 31, which consequently produces a logic 1 output which is stored in the RAM 32 via the enabled AND gate 29.

In each subsequent superframe the gate 23 continues to be inhibited, and the gate 29 continues to be enabled, by the logic 1 stored for the channel in the RAM 32 and applied to the other input of the OR gate 30. The output of the gate 28 is now 0, so that via the line 37 the selector 34 is caused in each superframe to select the previously stored count from the RAM 33 and to enter this into the counter 35, where it is reduced by one, the reduced count being re-stored in the RAM 33. When the count reaches zero, the outputs of the gates 31 and 29 become 0 so that a 0 is now stored in the RAM 32. In the next superframe, therefore, the OR gate 30 produces a 0 output to inhibit the gate 29 and enable the gate 23 so that, if the echo criteria described above are satisfied, the echo decision is produced.

It can be seen that because the echo decisions are based on averages of the voice channel samples, the extent and complexity of the circuitry required for storing signals and selecting the greatest magnitude, or peak, signal is very much less than it would be if individual channel samples were stored during the maximum end delay of 25 ms. The transmitter averages T and receiver averages RA are produced by two circuits each as shown in FIG. 2, one circuit for producing the transmitter averages T from the individual channel samples on the transmit path, and the other circuit for producing the receiver averages RA from the individual channel signals on the receive path.

Figure 2:
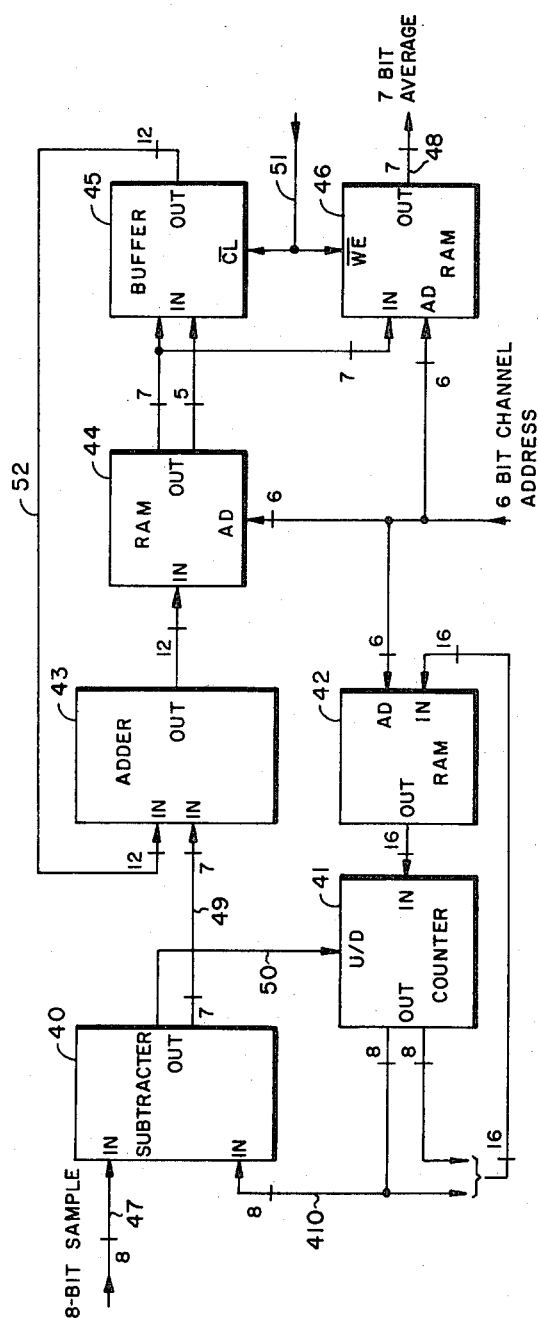
FIG. 2 illustrates an offset remover and averaging circuit for supplying offset-removed and averaged signals to the echo detector.

The circuit illustrated in the form of a block diagram in FIG. 2 consists of a d.c. offset remover and an averaging circuit. The offset remover consists of an 8-bit subtractor 40, a 16-bit up/down counter 41, and a 48-channel by 16-bit RAM 42. The averaging circuit consists of a 12-bit adder 43, a 48-channel by 12-bit RAM 44, a buffer 45 having a clear input $\overline{CL}$, and a 48-channel by 8-bit RAM 46 having a write-enable input $\overline{WE}$. Each of the RAMs is addressed in turn for each channel, once in each frame, with the appropriate receiver or transmitter channel address via an address input AD. The individual voice channel signals, from the receive path or the transmit path, are supplied via lines 47, and the resultant averages RA or T are produced on lines 48.

The offset remover serves to produce on lines 49 for each channel a 7-bit magnitude signal from which long-term d.c. offsets have been removed, and to this end the offset remover in operation reaches an equilibrium state in which for each channel a 16-bit offset value of the channel is stored in the RAM 42. In each frame, for each channel, the stored offset value of the channel is loaded from the RAM 42 into the counter 41 and is available at the counter output. The 8 most significant bits of the offset value are applied via lines 410 to the subtractor 40, which subtracts the offset value bits from the current channel signal to produce the 7-bit magnitude signal on the lines 49 and a sign bit on a further output line 50. This line 50 is connected to an up/down counting control input U/D of the counter 41 and causes the count of the counter to be increased or decreased by 1 depending on the polarity of the sign bit on the line 50. The counter 41 thus produces a new, modified, 16-bit offset value for the channel at its output, and this new value is written into the RAM 42 in place of the previous offset value for the channel. This sequence is repeated for subsequent channels in each frame.

In the long term, the equilibrium state reached is such that for each channel the numbers of positive and negative sign bits produced on the line 50 are equal. Although the stored offset value of each channel varies, only the 8 most significant bits of this are subtracted from the channel information, and in fact 256 sign bits of one polarity are required in order to change the subtracted offset value bits by one step.

The averaging circuit serves to produce, for each channel, the 7-bit average on the lines 48. In fact, in order to simplify implementation of the circuit, each average on the lines 48 is actually a fraction of 27/32 of the actual average of the signals on the lines 49. For each channel, this average is updated in the thirteenth frame of each superframe by a signal applied via a line 51 to the input $\overline{CL}$ of the buffer 45 and the input $\overline{WE}$ of the RAM 46, to write a new average into the store 46 and to clear the buffer 45.

For each channel, in each frame of the superframe, the output of the adder 43 is stored in the RAM 44. The adder output is equal to the sum of 7-bit magnitude signal of the particular channel, present on the lines 49, and a 12-bit cumulative sum for the particular channel present on the lines 52. The cumulative sum for the channel is the previously stored sum for the channel which was stored in the RAM 44, which is clocked through the buffer 45 in each frame except the thirteenth frame of each superframe when, as described above, the buffer 45 is cleared to reduce the cumulative sum to zero.

In the thirteenth frame of each superframe, therefore, for each channel the 12-bit cumulative sum produced at the output of the RAM 44 is equal to the sum of the offset-removed magnitude signals for that channel during the preceding 27 frames. Only the 7 most significant bits of this sum are written into the RAM 46 to achieve a division of the sum by a factor of 32; hence the average is 27/32 of the actual average. This minor difference does not adversely affect the operation of the echo detector.

Whilst a preferred embodiment of the invention has been described in detail, it will be appreciated that numerous modifications, adaptions, and variations may be made thereto without departing from the scope of the invention as defined in the claims.

What is claimed is:

1. An echo detector for detecting the presence on a first path of echoes of a sampled voice channel signal on a second path, comprising:

means responsive to speech signals for producing a first signal when speech signals are present on the first path;

means responsive to speech signals for producing a second signal when speech signals are present on the second path;

means for storing the n most recent signals which have occurred on the second path, where n is a plural integer equal to the number of signals which occur on the second path during a first predetermined period;

means for determining the greatest magnitude of the stored signals;

means for producing a third signal in dependence upon the magnitude of the signal on the first path relative to the determined greatest magnitude; and means responsive to the first, second, and third signals for producing an echo decision for the signal on the first path.

2. An echo detector as claimed in claim 1 wherein the means for producing the third signal produces said third signal whenever a signal on the first path has a magnitude which is not at least a predetermined amount greater than said current greatest magnitude.

3. An echo detector as claimed in claim 1 and including means for inhibiting production of the echo decision for a second predetermined period in response to the third signal being produced for a signal on the first path, following a signal on the first path for which the first signal was produced and the third signal was not produced.

4. An echo detector as claimed in claim 1, 2, or 3 wherein at least one of said means responsive to speech signals comprises a comparator for comparing signals on the relevant path with a fixed threshold level.

5. An echo detector as claimed in claim 1, 2, or 3 and including means for producing each signal on the first path and on the second path by removing d.c. offsets from and averaging a plurality of individual samples of respective voice channel signals.

6. A method of detecting the presence on a first path of echoes of a sampled voice channel signal on a second path, comprising the steps of:

detecting speech signals on each of said paths;

storing the n most recent signals which have occurred on the second path, n being a plural integer;

determining the greatest magnitude of the stored signals;

comparing the signal on the first path with the determined greatest magnitude; and producing an echo decision in response to the detection of speech signals and the comparison.

7. A method as claimed in claim 6 wherein each signal on each of said paths is constituted by an average of a plurality of individual samples of a respective voice channel signal, the method further comprising the step of producing each signal on each of said paths by removing d.c. offsets from and averaging a plurality of individual samples of the respective voice channel signal.

* * * * *